(12) United States Patent
Meng et al.

(10) Patent No.: US 10,620,715 B2
(45) Date of Patent: Apr. 14, 2020

(54) PROGRAMMATIC, PLUGGABLE KEYBOARD

(71) Applicant: International Business Machines Corporation, Armonk, NY (US)

(72) Inventors: Qing Y. Meng, Beijing (CN); Tian J. Yang, Beijing (CN); Yi Yao, Beijing (CN); Jian Zhang, Beijing (CN); Xue Y. Zhang, Beijing (CN); Yu Zhao, Beijing (CN)

(73) Assignee: INTERNATIONAL BUSINESS MACHINES CORPORATION, Armonk, CA (US)

( * ) Notice: Subject to any disclaimer, the term of this patent is extended or adjusted under 35 U.S.C. 154(b) by 289 days.

(21) Appl. No.: 15/464,212

(22) Filed: Mar. 20, 2017

(65) Prior Publication Data
US 2018/0267622 A1 Sep. 20, 2018

(51) Int. Cl.
*G06F 3/023* (2006.01)
*G06F 3/02* (2006.01)
*H01H 13/86* (2006.01)

(52) U.S. Cl.
CPC .......... *G06F 3/0238* (2013.01); *G06F 3/0216* (2013.01); *H01H 13/86* (2013.01); *H01H 2219/002* (2013.01); *H01H 2223/032* (2013.01); *H01H 2223/054* (2013.01)

(58) Field of Classification Search
CPC ..... G06F 3/0216; G06F 3/0238; H01H 13/86; H01H 2219/002; H01H 2223/032; H01H 2223/054
See application file for complete search history.

(56) References Cited

U.S. PATENT DOCUMENTS

| 4,551,717 | A | * | 11/1985 | Dreher | G06F 3/0238 200/314 |
| 4,688,020 | A | * | 8/1987 | Kuehneman | G06F 3/0238 341/22 |
| 5,164,723 | A | * | 11/1992 | Nebenzahl | G06F 3/0238 200/309 |
| 5,864,334 | A | | 1/1999 | Sellers | |
| 5,938,353 | A | * | 8/1999 | Butler | 400/492 |

(Continued)

FOREIGN PATENT DOCUMENTS

| CN | 101645948 B | 8/2012 |
| CN | 103513780 A | 1/2014 |

OTHER PUBLICATIONS

David Pallmann et al., "Customizable LCD Keyboard", Jan. 25, 2016,[online], [retrieved from the Internet], <URL:http://www2.ensc.sfu.ca/~whitmore/courses/ensc305/projects/2016/2prop.pdf>.

*Primary Examiner* — Afroza Chowdhury
(74) *Attorney, Agent, or Firm* — Law Offices of Ira D. Blecker, P.C.

(57) ABSTRACT

A physical computer keyboard which includes: a circuit board having touchpoints; physical programmable, pluggable keys such that each of the keys is programmable to provide the function of each of the keys, each of the keys having interlocking elements to join with an adjoining key, each key having connectors on a bottom surface of each key to make electrical contact with the touchpoints; and display panels with one display panel on a top surface of each key, the function of each key being displayed on the display panel of each key.

20 Claims, 10 Drawing Sheets

(56) References Cited

U.S. PATENT DOCUMENTS

| | | | |
|---|---|---|---|
| 6,536,966 B1 * | 3/2003 | Butler | G06F 1/1666 |
| | | | 400/472 |
| 6,650,254 B1 * | 11/2003 | Rix | G06F 3/0202 |
| | | | 341/20 |
| 6,781,077 B2 * | 8/2004 | Olodort | H01H 3/125 |
| | | | 200/344 |
| 8,987,573 B1 * | 3/2015 | Lippens | G09B 15/002 |
| | | | 84/478 |
| 9,098,250 B2 * | 8/2015 | Doi | G06F 1/1616 |
| 9,146,622 B2 | 9/2015 | Cresp et al. | |
| 10,090,121 B2 * | 10/2018 | Winter | H01H 13/705 |
| 2002/0084919 A1 * | 7/2002 | Green | G06F 3/0238 |
| | | | 341/22 |
| 2003/0206153 A1 * | 11/2003 | Murphy | G06F 3/0202 |
| | | | 345/168 |
| 2003/0218599 A1 | 11/2003 | Burke | |
| 2005/0019079 A1 * | 1/2005 | Griffin | G06F 1/1626 |
| | | | 400/486 |
| 2005/0057517 A1 * | 3/2005 | Rix | G06F 3/0202 |
| | | | 345/168 |
| 2006/0045599 A1 | 3/2006 | Ongkojoyo | |
| 2006/0132449 A1 * | 6/2006 | Pironio | G06F 3/0238 |
| | | | 345/172 |
| 2008/0088590 A1 * | 4/2008 | Brown | G06F 3/0238 |
| | | | 345/168 |
| 2008/0131184 A1 * | 6/2008 | Brown | G06F 3/0238 |
| | | | 400/490 |
| 2012/0068933 A1 | 3/2012 | Larsen | |
| 2013/0019191 A1 | 1/2013 | Arnold | |
| 2013/0154937 A1 | 6/2013 | Park | |
| 2015/0100913 A1 | 4/2015 | Park | |

* cited by examiner

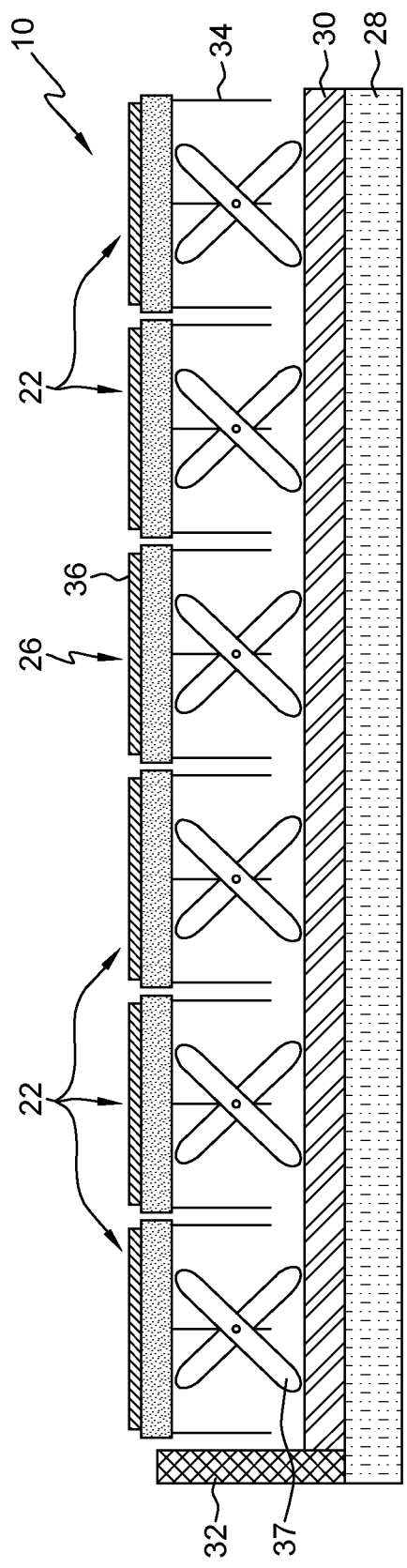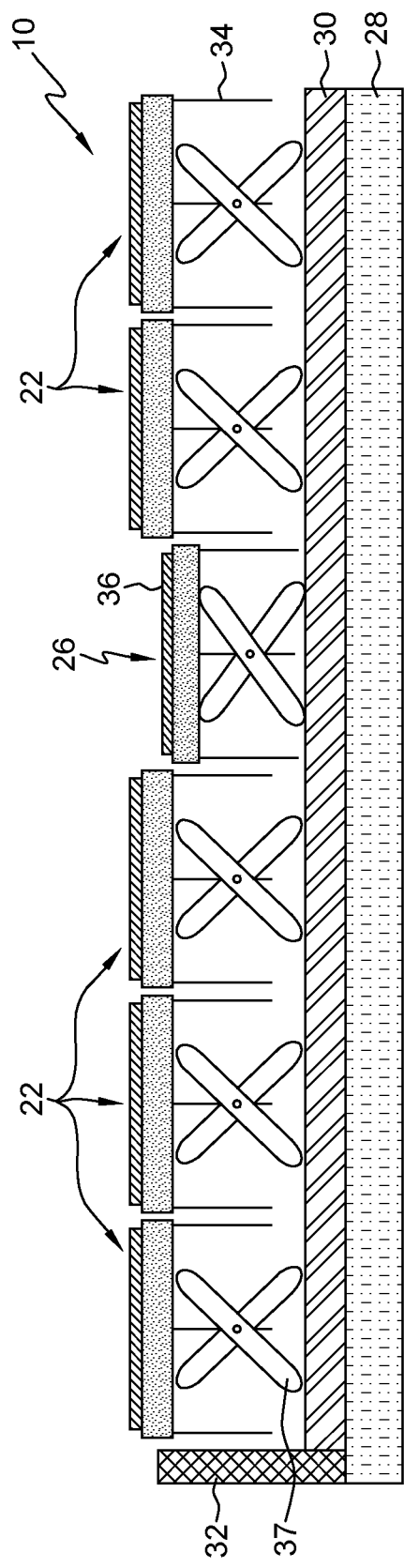
FIG. 2A
FIG. 2B

PROGRAMMATIC, PLUGGABLE KEYBOARD

BACKGROUND

The present exemplary embodiments pertain to computers and computer keyboards, and in particular, to physical keyboards that may be customized by changing the size, shape and function of each of the keys of the keyboard.

Keyboards, originally designed for typewriters, have long been a primary mechanism for receiving input from users of computers and other electronic devices. Conventional computer keyboards are predominantly mechanical devices that included arrays of physical keys that were triggered when depressed by users. A separate display such as a CRT monitor or LCD panel displayed information to the user, and the depression of keys resulted in the display of corresponding text characters on the display. Eventually computer keyboards were supplemented by pointing devices such as mice and track pads that controlled a movable pointer, enabling a user to "point and click" on graphical controls displayed on a display in order to perform desired operations on a computer.

The layout of conventional keyboards is typically fixed at manufacture so that the physical key size and layout cannot be changed.

BRIEF SUMMARY

The various advantages and purposes of the exemplary embodiments as described above and hereafter are achieved by providing, according to an aspect of the exemplary embodiments, a circuit board having a plurality of touchpoints; a plurality of physical programmable, pluggable keys such that each of the keys is programmable to provide the function of each of the keys, each of the keys having interlocking elements to join with at least one adjoining key that constrain horizontal movements with respect to the at least one adjoining key but allow vertical movements of each of the keys, each key having connectors on a bottom surface of each key to make electrical contact with the touchpoints; and a plurality of display panels with one display panel on a top surface of each key, the programmed function of each key being displayed on the display panel of each key.

According to another exemplary embodiment, there is provided a system comprising: a computer processor; a display; and a physical computer keyboard. The physical computer keyboard comprising: a circuit board having a plurality of touchpoints; a plurality of physical programmable, pluggable keys such that each of the keys is programmable to provide the function of each of the keys, each of the keys having interlocking elements to join with at least one adjoining key that constrain horizontal movements with respect to the at least one adjoining key but allow vertical movements of each of the keys, each key having connectors on a bottom surface of each key to make electrical contact with the touchpoints; and a plurality of display panels with one display panel on a top surface of each key, the function of each key being displayed on the display panel of each key According to a further exemplary embodiment, there is provided a method for manufacturing a physical computer keyboard comprising a circuit board having a plurality of touchpoints, a plurality of physical programmable, pluggable keys such that each of the keys is programmable to provide the function of each of the keys, a plurality of display panels with one display panel on a top surface of each key, the function of each key being displayed on the display panel of each key and a virtual keyboard assistant. The method comprising: detecting and displaying by the virtual keyboard assistant the current keyboard layout on a display; defining by the virtual keyboard assistant the functional mapping of the keys; defining by the virtual keyboard assistant combinations of functional keys; defining by the virtual keyboard assistant the symbol displayed on each key; and programming by the virtual keyboard assistant the functional mapping of the keys, the combinations of functional keys and the symbol displayed on each key.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 2A illustrates a cross sectional view of the programmatic, pluggable keyboard illustrated in FIG. 1 in the direction of arrows 2-2 with the keys not pressed and FIG. 2BA illustrates the cross sectional view of the programmatic, pluggable keyboard illustrated in FIG. 2A with one key pressed down to make contact with the underlying circuit board.

FIGS. 5A, 5B, 5C and 5D illustrate various embodiments of key shapes wherein FIG. 5A illustrates a rectangular key shape, FIG. 5B illustrates a triangular key shape, FIG. 5C illustrates a circular key shape and FIG. 5D illustrates a half-circle key shape.

DETAILED DESCRIPTION

The present inventors recognize that conventional keyboards having a fixed key size and layout may not be fit for every user in every industry. Nor may the conventional keyboards align with personal user preferences. For example, conventional keyboards may not be suitable for disabled individuals, senior citizens or users with impaired vision. Further, with conventional keyboards having a fixed layout, the conventional keyboards cannot be modified for different layouts such as for reading, editing, games playing, etc.

Figure 1:
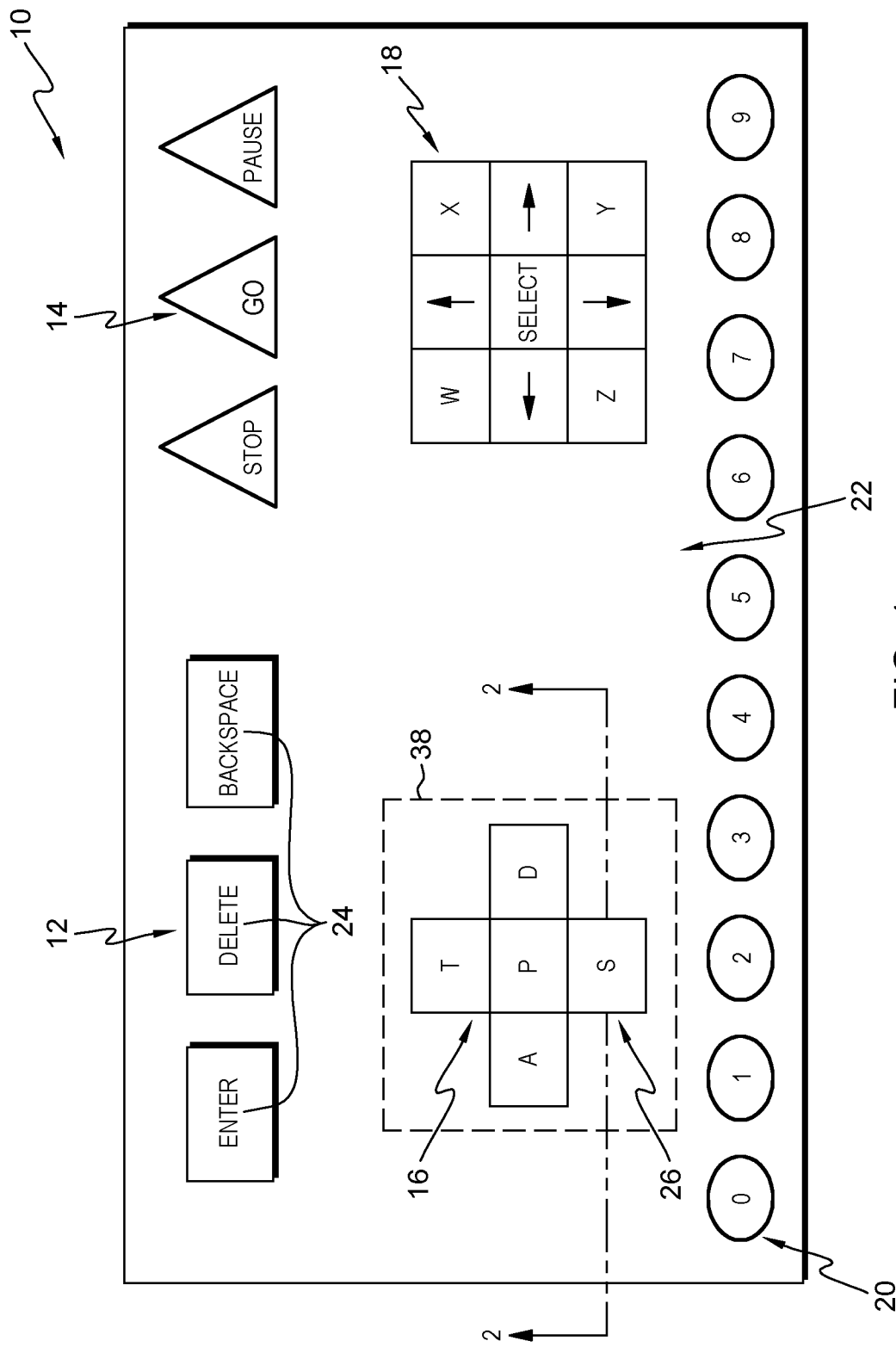
FIG. 1 illustrates a plan view of a programmatic, pluggable keyboard of the exemplary embodiments.

Referring to the Figures in more detail, FIG. 1 illustrates a programmatic, pluggable keyboard 10. It should be understood that the programmatic, pluggable keyboard 10 is a physical keyboard having individual keys that move downward when pressed and not a virtual keyboard as might be displayed on a display of a tablet or other computer device. The programmatic, pluggable keyboard 10 may be, for example, for a laptop, desktop or any other type of computer device.

The programmatic, pluggable keyboard 10 includes a circuit board (not shown in FIG. 1) having a plurality of touchpoints. Contrary to other keyboards, the circuit board of the exemplary embodiments has no fixed touchpoints corresponding to the keys of the programmatic, pluggable keyboard 10. Instead, the circuit board has many more touchpoints than keys that detect the signal initiated by the key hitting the circuit board.

The programmatic, pluggable keyboard 10 further includes a plurality of physical programmable, pluggable keys such that each of the keys is programmable to provide the function of each of the keys. A user may arrange the keys in any manner that the user desires to achieve the user's objective for use of the programmatic, pluggable keyboard 10.

For example, the programmatic, pluggable keyboard 10 shows a cluster of rectangular keys 12 at the top of the programmatic, pluggable keyboard 10 for the functions "enter", "delete" and "backspace". There may be another cluster of triangular shaped keys 14 at the top of the programmatic, pluggable keyboard 10 for the functions "stop", "go" and "pause". In the middle left of the programmatic, pluggable keyboard 10 there may be rectangular keys 16 arranged in a plus sign configuration for the letters "A", "P", "D", "T" and "S". In the middle right of the programmatic, pluggable keyboard 10 there may be nine rectangular keys for the letters "W", "X", "Y" and "Z" as well as cursor arrows for up, down, left and right and a "select" button in the middle. Along the bottom of the programmatic, pluggable keyboard 10 there may be circular keys 20 for the numbers 0 to 9.

While not shown in detail in FIG. 1, the spaces between the denoted keys 12, 14, 16, 18 may be filled with other keys 22 having, for example, a rectangular, circular or triangular shape. Keys 22 have not been assigned a function so that in terms of the layout of the programmatic, pluggable keyboard 10, keys 22 are nonfunctional in that if one of the keys 22 was pressed, no corresponding action would occur. The entire keyboard may be made up of keys having a shape such as rectangular, circular or triangular. What distinguishes keys that are blank (such as keys 22) from keys that have symbols (such as keys 12, 14, 16, 18, 20) is that the keys 12, 14, 16, 18, 20 have been programmed to show the symbol and perform the function denoted by the symbol whereas the blank keys show no symbols and perform no function.

Each of the keys in the programmatic, pluggable keyboard 10 has a display (not shown in FIG. 1). The display may be any type of display now or hereafter available. Some examples of such displays may be LED (light emitting diode), LCD (liquid crystal display) or OLED (organic light emitting diode). The keys may be programmed by a virtual keyboard assistant to perform a function and display a symbol or indicia of some sort (hereafter collectively referred to as "symbol") that denotes the function of the keys. For example, the keys 12 have been programmed to perform the functions of "enter", "delete" and "backspace" and have the "enter", "delete" and "backspace" symbols 24 to indicate that keys 12 perform the functions of "enter", "delete" and "backspace".

A section of the programmatic, pluggable keyboard 10, in the direction of arrows 2-2 in FIG. 1, is illustrated in FIGS. 2A and 2B. There may be a base 28 to hold the programmatic, pluggable keyboard 10 including the circuit board 30 and keys. There may be a spring or bracket 37 to space the keys from the circuit board 30 until the keys are pressed. There may also be a side frame 32 to further support the programmatic, pluggable keyboard 10. The keys shown in FIGS. 2A and 2B are only a portion of the keys that comprise the programmatic, pluggable keyboard 10 and include the blank keys 22 and the key 26 which has been programmed to insert the letter "S" in a document or web page when pressed and to display the symbol "S" on the key 26. Each of the keys 22, 26 includes a display 36 to display the symbol indicating the function of the keys 22, 26. Each of the keys 22, 26 may further include contacts 34 for making contact with the circuit board 30. The contacts 34 serve the purpose of identifying the keys so that they can be programmed and also to display the symbol indicating the function of the keys. FIGS. 2A and 2B illustrate each key having three contacts 34 but there may be more contacts 34 depending on the design of the circuit board 30. One contact may be used to indicate that the key has been pressed and released and the other contacts may be used for display of the function of the key.

FIG. 2A illustrates the keys 22, 26 when no key has been pressed. FIG. 2B illustrates the keys 22, 26 when key 26 has been pressed so that the contacts 34 make physical and electrical contact with the circuit board 30.

Figure 3:
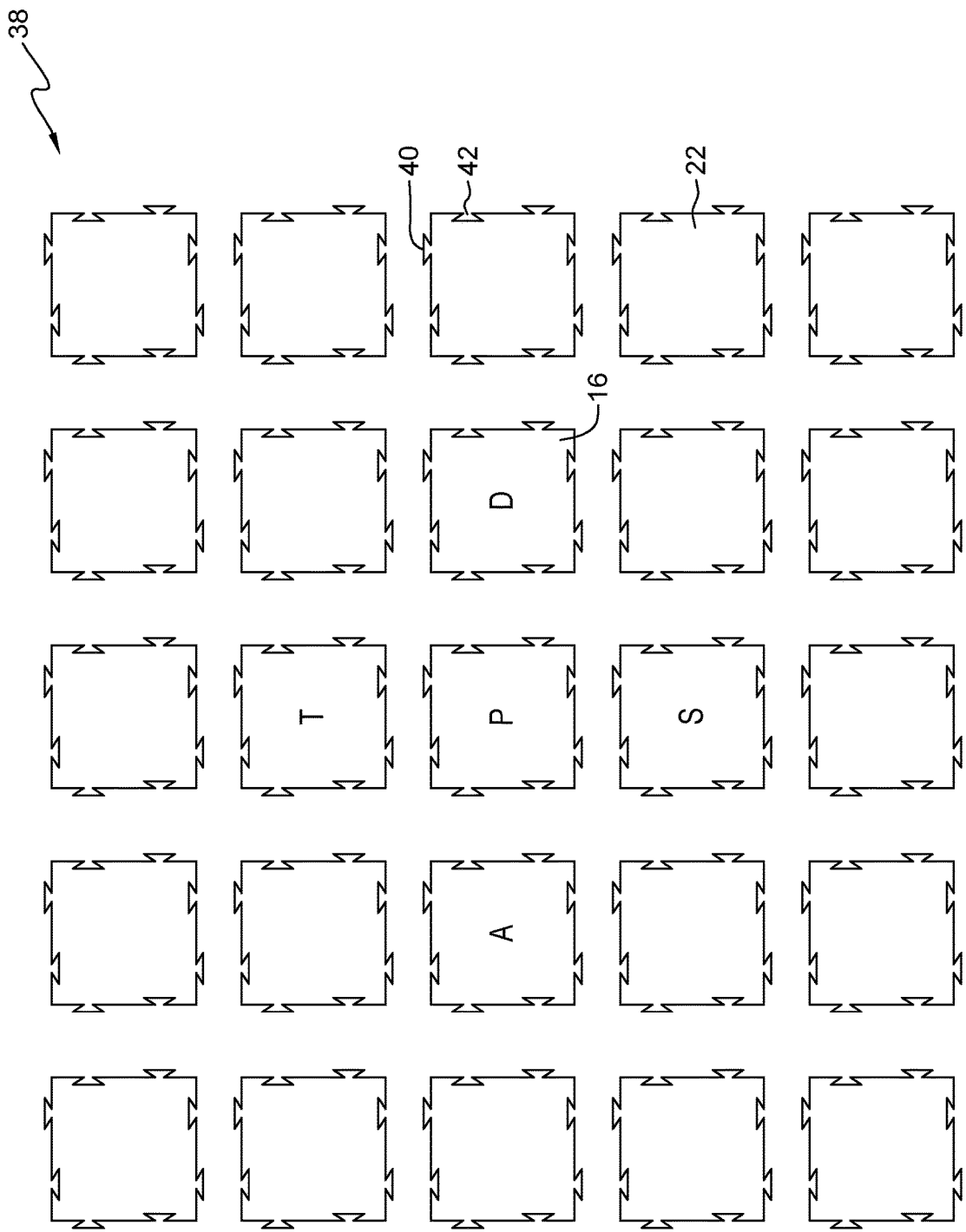
FIG. 3 illustrates in more detail the keys from the area outlined in dashed lines in FIG. 1 wherein the individual keys are disassembled.

Each of the keys have interlocking elements to join with an adjoining key. In FIG. 1, there is an area 38 (indicated by dashed lines) surrounding keys 16 and some of keys 22. Area 38 is shown in more detail in FIG. 3 with one difference being that the various keys 16, 22 have been separated. The interlocking elements that join one key to another key are shown in more detail. The interlocking elements may include a projection 40 and a matching groove 42, essentially similar to a tongue and groove configuration. It is noted that each key has at least one projection 40 and one groove 42 on each side of the keys. It is further noted that some of the keys are keys 22 which are blank and thus have not been assigned any function and other of the keys are keys 16 which have been assigned the functions of letters "A", "P", "D", "T" and "S".

Figure 4:
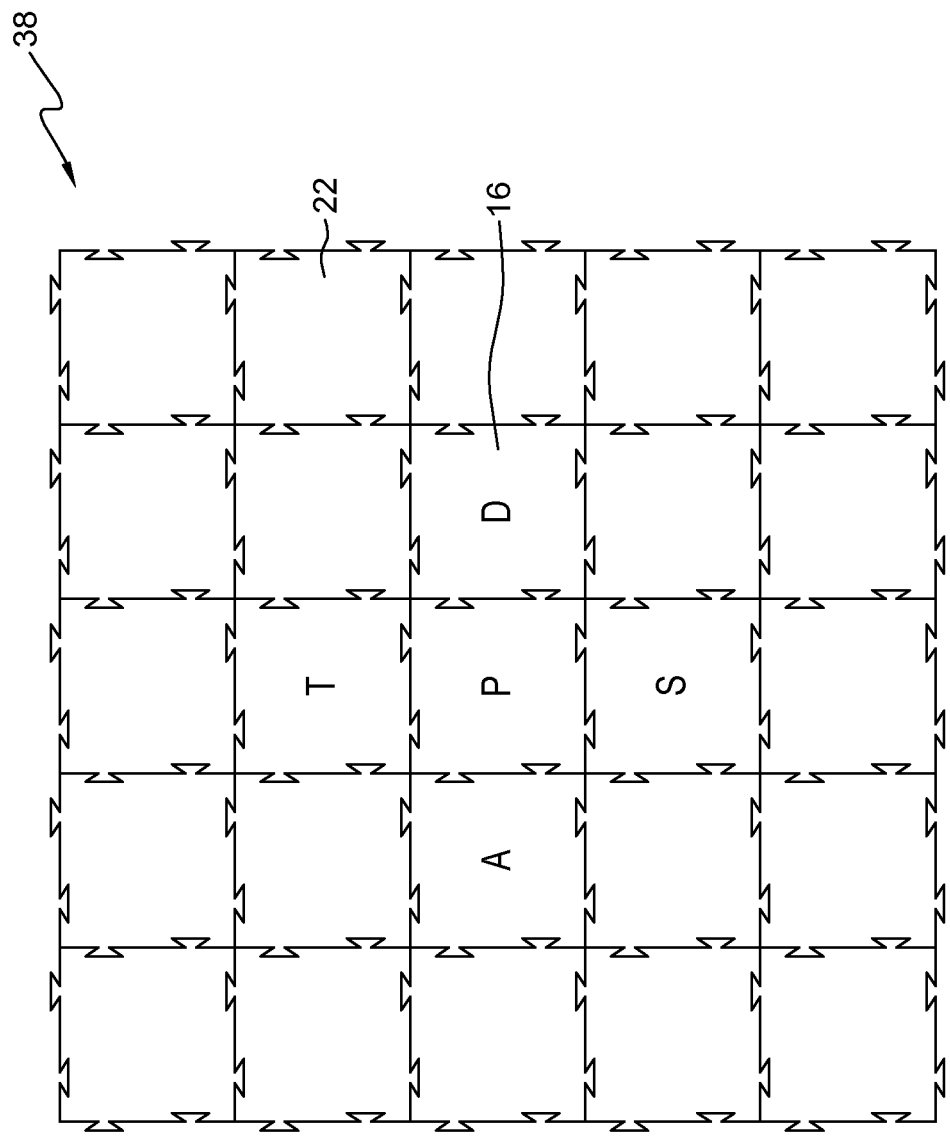
FIG. 4 illustrates in more detail the keys from the area outlined in dashed lines in FIG. 1 wherein the individual keys are assembled.

Referring now to FIG. 4, the keys 16, 22 have been interlocked together using projections 40 and matching grooves 42 as they would appear in the programmatic, pluggable keyboard 10. The keys 16, 22 are slidably engaged so that the keys 16, 22 are constrained in their movements horizontally but may freely move vertically to make contact with the circuit board 30. Returning back to FIG. 2, it can be seen that while keys 22, 26 are constrained in the horizontal direction, the individual keys may freely move vertically such as is the case with key 26 which may move vertically downward when pressed to make contact with the circuit board 30.

Figure 5B:
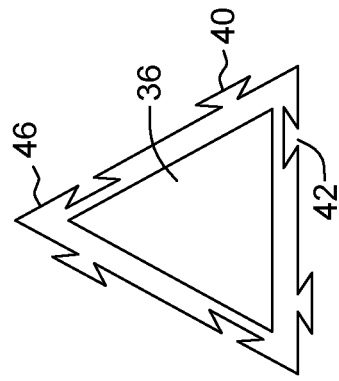
Figure 5D:
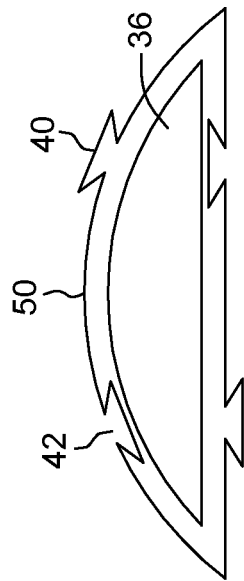
Figure 5A:
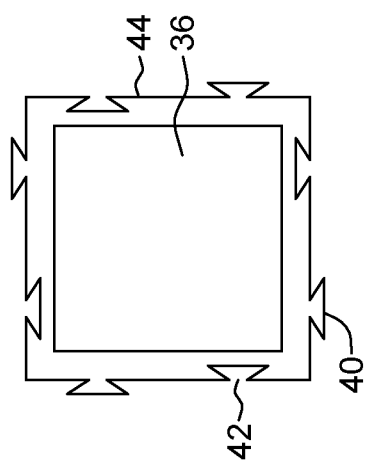

Referring now to FIGS. 5A, 5B, 5C and 5D, various embodiments of the key shapes are illustrated. FIG. 5A illustrates a rectangular, preferably square, key shape 44 having projections 40 and grooves 42. Also shown is a display 36.

FIG. 5B illustrates a triangular key shape 46 having projections 40 and grooves 42. Also shown is a display 36.

Figure 5C:
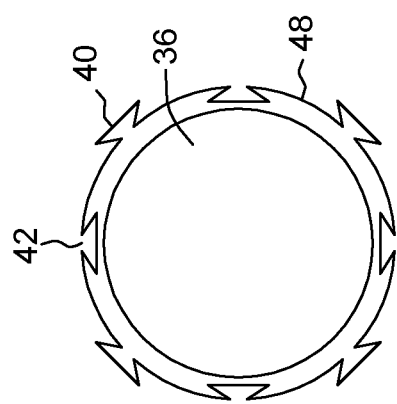

FIG. 5C illustrates a circular key shape 48 having projections 40 and grooves 42. Also shown is a display 36.

FIG. 5D illustrates a supplementary half-circle key shape 50 having projections 40 and grooves 42. Also shown is a display 36.

The key shapes illustrated in FIGS. 5A to 5D are for purposes of illustration and not limitation. Shapes other than that shown in FIGS. 5A to 5D are within the scope of the exemplary embodiments.

Figure 6:
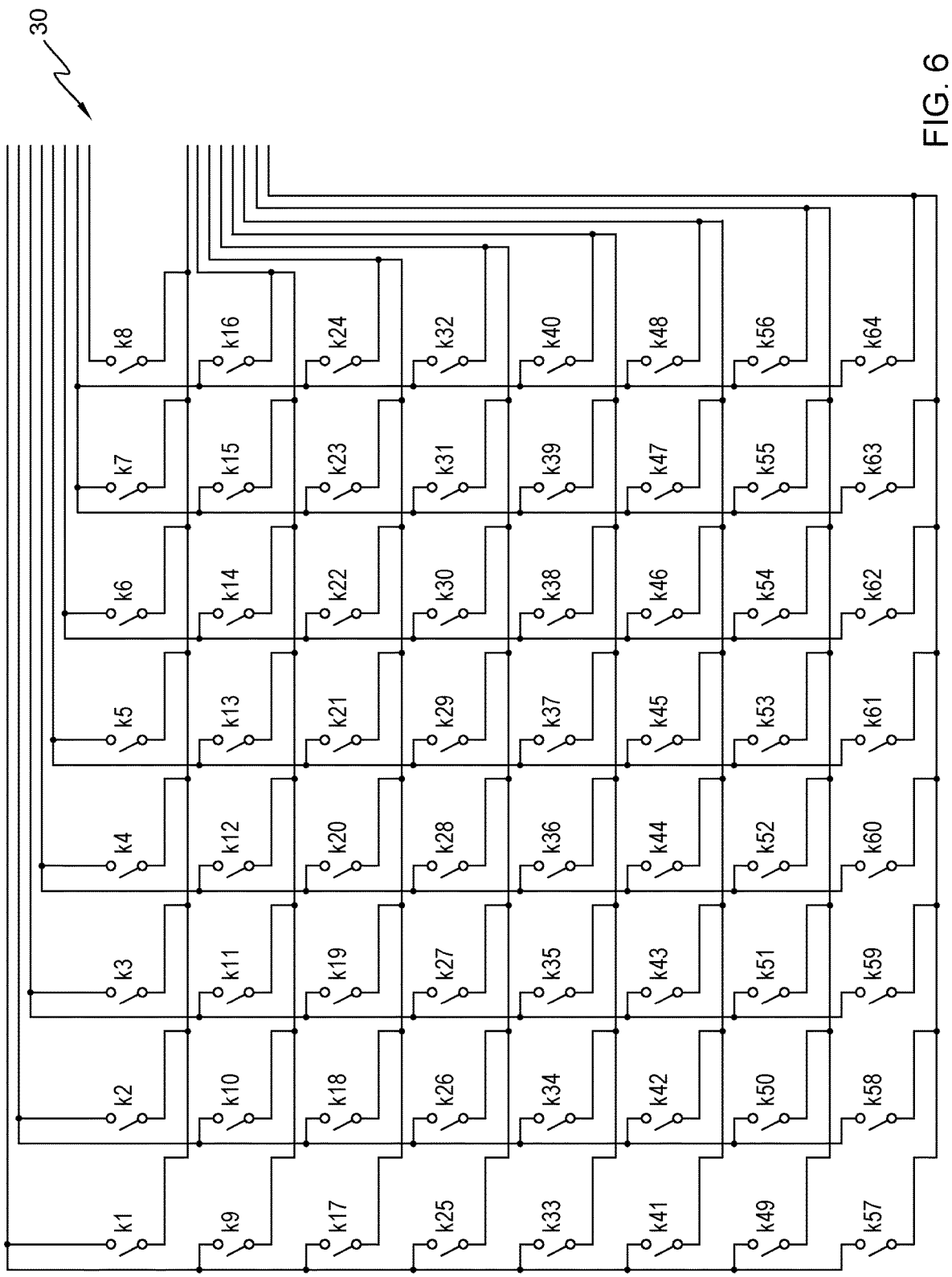
FIG. 6 illustrates a plan view of the circuit board showing the touchpoint logic for the keys.
Figure 7:
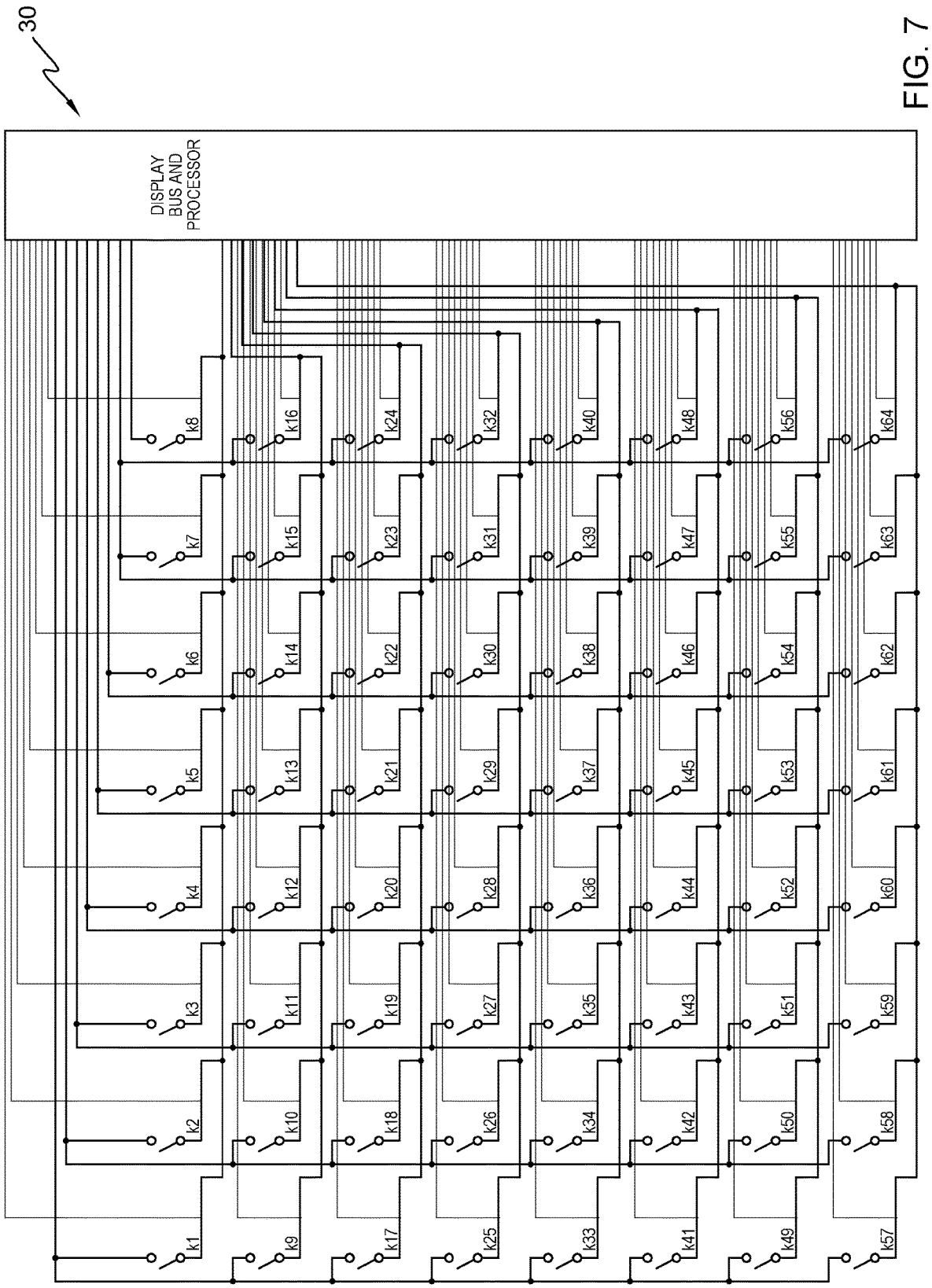
FIG. 7 illustrates a plan view of the circuit board showing the display bus logic for each of the LED displays on the keys.

FIG. 6 is a plan view of the circuit board 30 illustrating the touchpoint logic and FIG. 7 is a plan view of the circuit board illustrating the display bus logic for each of the displays 36 on the keys.

Figure 8:
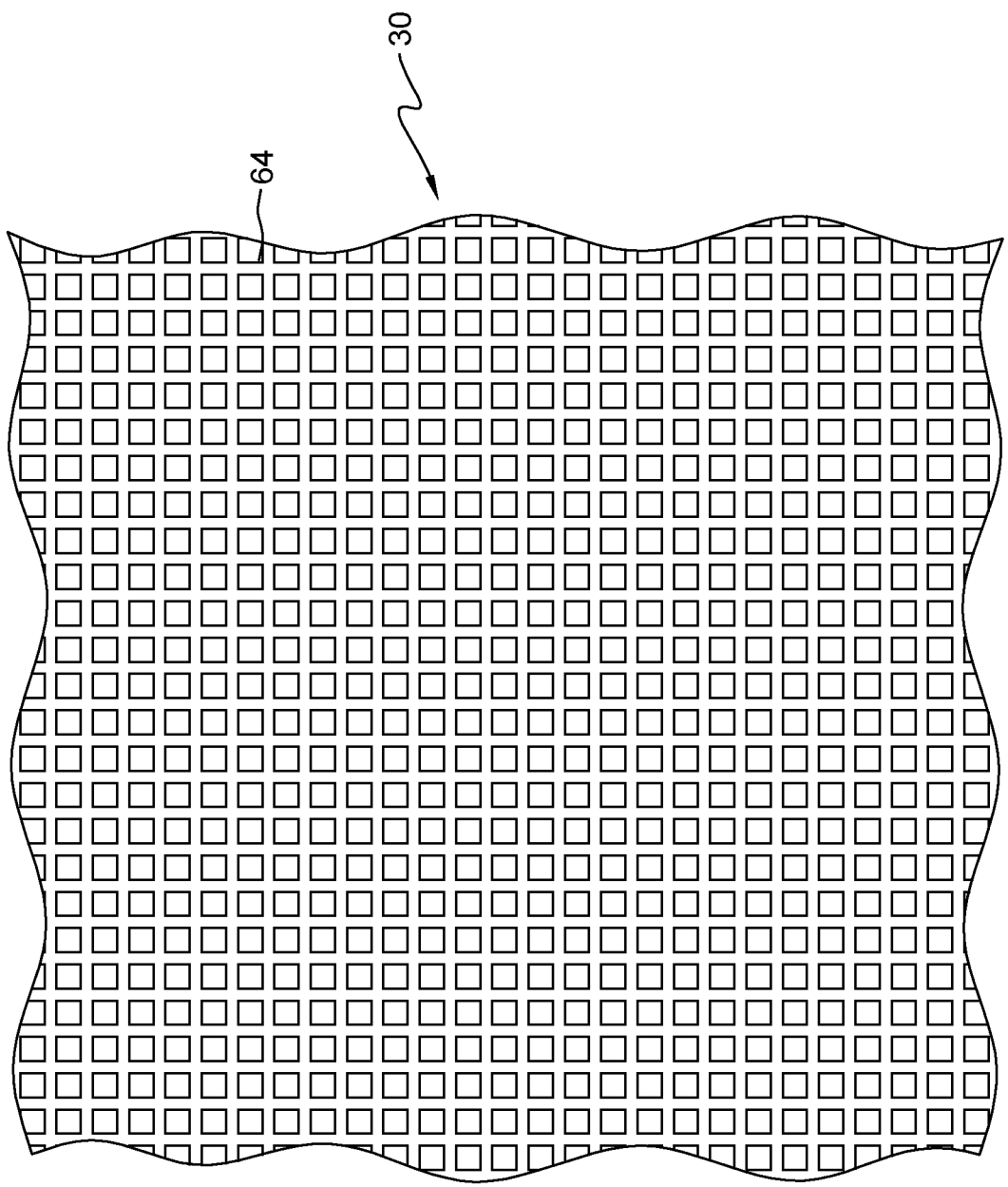
FIG. 8 illustrates an enlarged, partial plan view of the circuit board showing the touchpoints for the keys.

FIG. 8 illustrates a partial plan view of the circuit board 30 showing the touchpoints 64. The circuit board 30 may have, for example, six thousand touchpoints 64 although other exemplary embodiments may have more or less than the six thousand touchpoints 64. The large number of touchpoints 64 in circuit board 30 is substantially more than the approximately eighty touchpoints in conventional keyboards. The large number of touchpoints 64 in circuit board 30 enables free placement of the keys to suit the needs of the user while also ensuring that each of the keys makes physical and electrical contact with the touchpoints 64 when pressed.

Figure 9:
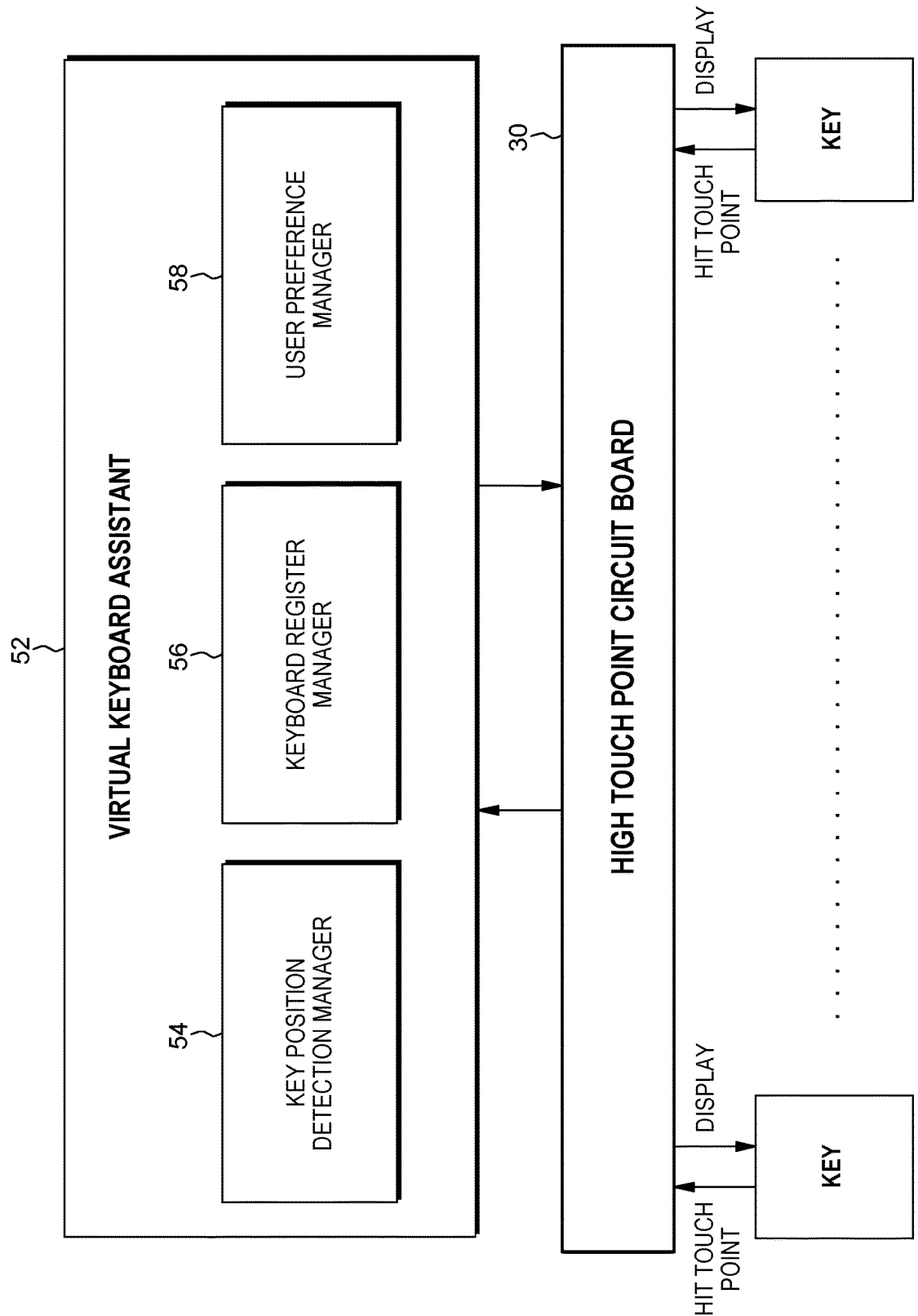
FIG. 9 illustrates a virtual keyboard assistant for programming the programmatic, pluggable keyboard.

Referring now to FIG. 9, there is illustrated the virtual keyboard assistant 52 which is a keyboard setting tool to define logic of the keys with respect to the circuit board and also visualizes the programmatic, pluggable keyboard 10 on a display of the computer device.

The virtual keyboard assistant 52 may perform the following functions:
  detect and display the current keyboard layout;
  define the functional mapping of the keys;
  define combinations of functional keys;
  define the symbol displayed on each key;
  define display style like color, contrast, brightness, etc;
  customize any desired user pattern, and
  program the keys in the keyboard layout to perform the defined function and display the symbol and display style.

The virtual keyboard assistant 52 may include a key position detection manager 54, a keyboard register manager 56 and a user preference manager 58.

The key position detection manager 54 more specifically receives a key signal when a key is depressed and checks the key signal with the keyboard register manager to indicate what function has been assigned to the key or the combination of keys.

The keyboard register manager 56 more specifically records and manages functional assignment of the keys and what key combinations stand for. The keyboard register manager 54 may also cause the symbol to be displayed on the keys and may also cause the keyboard layout to be displayed on a computer screen such as an LED or LCD screen. For example, FIG. 1 illustrates a grouping of keys 16 that have the symbols "A", "P", "D", "T" and "S". Instead, the programmatic, pluggable keyboard 10 may be reprogrammed so that all of the keys 16 perform the function of a "+" (plus) sign and each of the keys 16 displays a part of the symbol for the plus sign. Then, when any one of the keys 16 that make up the plus sign is depressed, the "+" sign is displayed.

The user preference manager 58 more specifically manages a user's preference to support the keyboard to serve multiple users.

Figure 10:
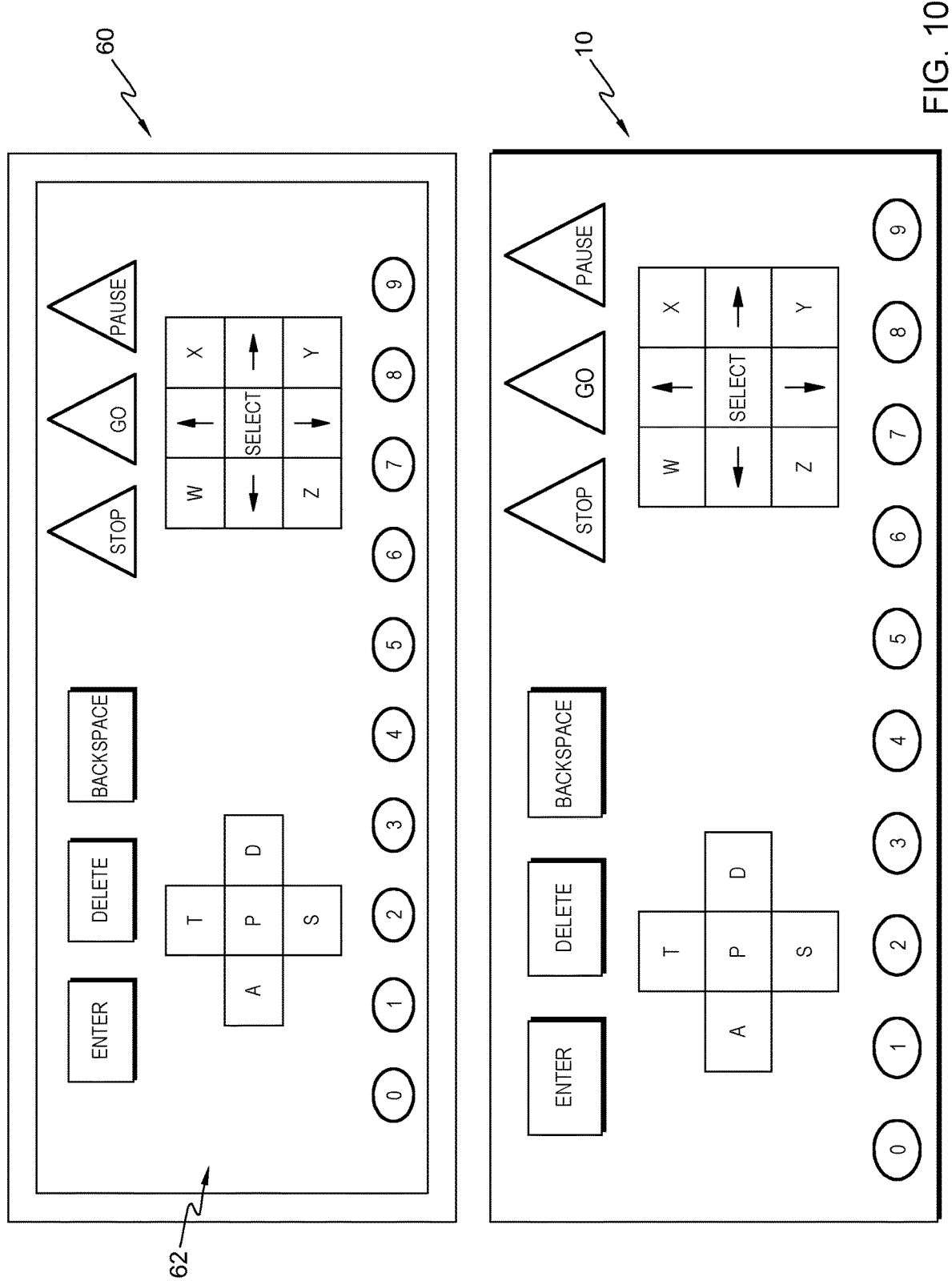
FIG. 10 illustrates a computer device, such as a laptop, having the programmatic, pluggable keyboard of the exemplary embodiments and a display showing a visualization of the programmatic, pluggable keyboard.

Referring now to FIG. 10, there is illustrated a computer device, such as a laptop, having the programmatic, pluggable keyboard 10 and a display 60, such as an LED display, LCD display or OLED display that may be on laptop computer devices. The display 60 illustrates the visualization 62 of the programmatic, pluggable keyboard 10 on the display 60 that may occur through the virtual keyboard assistant 52. The visualization 62 of the programmatic, pluggable keyboard 10 is not a physical keyboard as it is in the display whereas the programmatic, pluggable keyboard 10 is an actual physical keyboard.

As noted above, one of the functions of the virtual keyboard assistant 52 is to detect and display the current keyboard layout. The virtual keyboard assistant 52 has also defined the mapping of the keys and symbols attached to the keys and defined the symbol displayed on each key of the programmatic, pluggable keyboard 10.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A physical computer keyboard comprising:
    a plurality of physical programmable, pluggable keys;
    a circuit board having a plurality of touchpoints to make electrical contact with connectors of the keys such that the plurality of touchpoints is greater than the number of the keys;
    each of the keys is programmable to provide the function of each of the keys, each of the keys having interlocking elements to join and be slideably engaged with at least one adjoining key having interlocking elements that constrain horizontal movements with respect to the at least one adjoining key but allow vertical movements of each of the keys, each of the keys having the interlocking elements is joined with the at least one adjoining key having the interlocking elements and is programmable to provide the function of each of the keys, and each key including each of the keys having the interlocking elements is joined with the at the least one adjoining key having the interlocking elements and having the connectors on a bottom surface of each key to make electrical contact with the touchpoints; and
    a plurality of display panels with one display panel on a top surface of each key, the programmed function of each key being displayed on the display panel of each key.

2. The keyboard of claim 1 further comprising a virtual keyboard assistant to program the function of each key and display through the display panel on each key the function of each key.

3. The keyboard of claim 2 wherein the virtual keyboard assistant maps the keyboard and defines a layout of the keyboard.

4. The keyboard of claim 2 wherein the virtual keyboard assistant comprises a key position detection manager to receive a key signal when a key is depressed and check the key signal with a keyboard register manager to indicate what function has been assigned to the key or a combination of keys, the keyboard register manager to record and manage functional assignment of the keys and what key combinations stand for and a user preference manager to manage a user's preference to support the keyboard to serve multiple users.

5. The keyboard of claim 1 wherein the plurality of keys comprise a plurality of different shapes selected from the group consisting of rectangles, triangles and circles.

6. The keyboard of claim 1 wherein the interlocking elements comprise a plurality of grooves and projections.

7. The keyboard of claim 1 wherein the connectors of each key comprise three connectors wherein one connector is used to indicate that a key has made contact with the circuit board and two connectors are used to indicate the function of the key.

8. The keyboard of claim 1 wherein the connectors of each key make direct contact with the touchpoints.

9. The keyboard of claim 1 further comprising a frame to hold the circuit board and the plurality of keys.

10. A system comprising:
a computer processor;
a display; and
a physical computer keyboard comprising:
a plurality of physical programmable, pluggable keys;
a circuit board having a plurality of touchpoints to make electrical contact with connectors of the keys such that the plurality of touchpoints is greater than the number of the keys;
each of the keys is programmable to provide the function of each of the keys, each of the keys having interlocking elements to join and be slideably engaged with at least one adjoining key having interlocking elements that constrain horizontal movements with respect to the at least one adjoining key but allow vertical movements of each of the keys, each of the keys having the interlocking elements is joined with the at least one adjoining key having the interlocking elements and is programmable to provide the function of each of the keys, and each key including each of the keys having the interlocking elements is joined with the at least one adjoining key having the interlocking elements and having the connectors on a bottom surface of each key to make electrical contact with the touchpoints; and
a plurality of display panels with one display panel on a top surface of each key, the function of each key being displayed on the display panel of each key.

11. The system of claim 10 further comprising a virtual keyboard assistant to program the function of each key and display through the display panel on each key the function of each key.

12. The system of claim 11 wherein the virtual keyboard assistant maps the keyboard and defines a layout of the keyboard.

13. The system of claim 11 wherein the virtual keyboard assistant comprises a key position detection manager to receive a key signal when a key is depressed and check the key signal with a keyboard register manager to indicate what function has been assigned to the key or a combination of keys, the keyboard register manager to record and manage functional assignment of the keys and what key combinations stand for and a user preference manager to manage a user's preference to support the keyboard to serve multiple users.

14. The system of claim 10 wherein the plurality of keys comprise a plurality of different shapes selected from the group consisting of rectangles, triangles and circles.

15. The system of claim 10 wherein the interlocking elements comprise a plurality of grooves and projections.

16. The system of claim 10 wherein the connectors of each key comprise three connectors wherein one connector is used to indicate that a key has made contact with the circuit board and two connectors are used to indicate the function of the key.

17. The system of claim 10 wherein the connectors of each key make direct contact with the touchpoints.

18. The system of claim 10 further comprising a frame to hold the circuit board and the plurality of keys.

19. A computer-implemented method for manufacturing a physical computer keyboard comprising a plurality of physical programmable, pluggable keys, a circuit board having a plurality of touchpoints such that the plurality of touchpoints to make electrical contact with connectors of the keys is greater than the number of the keys, each of the keys is programmable to provide the function of each of the keys, a plurality of display panels with one display panel on a top surface of each key, the function of each key being displayed on the display panel of each key and a virtual keyboard assistant, each of the keys having interlocking elements to join and be slideably engaged with at least one adjoining key having interlocking elements that constrain horizontal movements with respect to the at least one adjoining key but allow vertical movements of each of the keys, each of the keys having the interlocking elements is joined with the at least one adjoining key having the interlocking elements and is programmable to provide the function of each of the keys, and the method comprising:
detecting and displaying by the virtual keyboard assistant the current keyboard layout on a display;
customizing the current keyboard layout by freely placing the keys on the keyboard to meet needs of a user, the freely placing of the keys accommodated by the plurality of touchpoints greater than the keys and the circuit board having no fixed touchpoints for the keys, the customizing according to:
defining by the virtual keyboard assistant the functional mapping of the keys;
defining by the virtual keyboard assistant combinations of functional keys;
defining by the virtual keyboard assistant the symbol displayed on each key; and
programming by the virtual keyboard assistant the functional mapping of the keys, the combinations of functional keys and the symbol displayed on each key.

20. The method of claim 19 further comprising interlocking each of the keys to join with at least one adjoining key.

\* \* \* \* \*